(12) United States Patent
Vajapeyam

(10) Patent No.: US 9,804,896 B2
(45) Date of Patent: Oct. 31, 2017

(54) THREAD MIGRATION ACROSS CORES OF A MULTI-CORE PROCESSOR

(71) Applicant: Empire Technology Development LLC, Wilmington, DE (US)

(72) Inventor: Sriram Vajapeyam, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 153 days.

(21) Appl. No.: 14/128,477

(22) PCT Filed: Jun. 11, 2013

(86) PCT No.: PCT/US2013/045129
§ 371 (c)(1),
(2) Date: Dec. 20, 2013

(87) PCT Pub. No.: WO2014/021995
PCT Pub. Date: Feb. 6, 2014

(65) Prior Publication Data
US 2015/0234687 A1     Aug. 20, 2015

(30) Foreign Application Priority Data
Jul. 31, 2012 (IN) .......................... 3140/CHE/2012

(51) Int. Cl.
*G06F 9/46* (2006.01)
*G06F 9/50* (2006.01)
(Continued)

(52) U.S. Cl.
CPC ........ *G06F 9/5088* (2013.01); *G06F 11/3006* (2013.01); *G06F 11/3433* (2013.01)

(58) Field of Classification Search
CPC . G06F 9/5088; G06F 11/3433; G06F 11/3006
(Continued)

(56) References Cited

U.S. PATENT DOCUMENTS

2001/0037448 A1\* 11/2001 Mukherjee .............. G06F 9/383
                                                                   712/244
2009/0089792 A1\* 4/2009 Johnson ................ G06F 9/4881
                                                                   718/105
(Continued)

FOREIGN PATENT DOCUMENTS

JP    EP 2613269 A1 \* 7/2013 ........... G06F 9/3834
WO    2012029111        3/2012

OTHER PUBLICATIONS

Naveh, A. et al., "Power and Thermal Management in the Intel Core Duo Processor", Intel Technology Journal, 2006, p. 109- 122.
(Continued)

*Primary Examiner* — Li B Zhen
*Assistant Examiner* — Sen Chen
(74) *Attorney, Agent, or Firm* — Moritt Hock & Hamroff LLP; Stgeven S. Rubin, Esq.

(57) ABSTRACT

Techniques described herein are generally related to thread migration across processing cores of a multi-core processor. Execution of a thread may be migrated from a first processing core to a second processing core. Selective state data required for execution of the thread on the second processing core can be identified and can be dynamically acquired from the first processing core. The acquired state data can be utilized by the thread executed on the second processing core.

32 Claims, 5 Drawing Sheets

(51) Int. Cl.
*G06F 11/34* (2006.01)
*G06F 11/30* (2006.01)

(58) Field of Classification Search
USPC .......................................................... 718/105
See application file for complete search history.

(56) References Cited

U.S. PATENT DOCUMENTS

| | | | | |
|---|---|---|---|---|
| 2009/0187912 A1* | 7/2009 | Lee | ....................... | G06F 9/4856 718/103 |
| 2011/0066830 A1* | 3/2011 | Wolfe | .................. | G06F 9/4856 712/228 |
| 2011/0145545 A1* | 6/2011 | Hunter | ................. | G06F 9/4856 712/30 |
| 2011/0213993 A1* | 9/2011 | Greenhalgh | ......... | G06F 1/3203 713/320 |
| 2012/0246446 A1* | 9/2012 | Solihin | .................... | G06F 9/30 712/205 |
| 2013/0179666 A1 | 7/2013 | Yamashita et al. | | |

OTHER PUBLICATIONS

Powell, M.D. et al., "Architectural Core Salvaging in a Multi-Core Processor for Hard-Error Tolerance", Int'l Symposium on Computer Architecture, Jun. 2009, 12 pages.

Constantinou, T. et al., "Performance Implications of Single Thread Migration on a Chip Multi-Core", SIGARCH Computer Architecture News, 2005, 12 pages.

International Search Report and Written Opinion for application with application No. PCT/US2013/045129, dated Sep. 13, 2013, 8 pages.

Cho, M. H., et al., "Deadlock-Free Fine-Grained Thread Migration," Fifth IEEE/ACM International Symposium on Networks on Chip (NoCS), pp. 33-40 (May 1-4, 2011).

Kamruzzaman, Md., et al., "Inter-core Prefetching for Multicore Processors Using Migrating Helper Threads," ASPLOS XVI Proceedings of the sixteenth international conference on Architectural support for programming languages and operating systems, pp. 393-404 (Mar. 5-11, 2011).

La Fratta, P. A., Optimizing the Internal Microarchitecture and ISA of a Traveling Thread PIM System, Graduate Program in Computer Science and Engineering, pp. 1-217 (Oct. 2010).

Rangan, K. K., et al., "Thread Motion: Fine-Grained Power Management for Multi-Core Systems," ISCA '09 Proceedings of the 36th annual international symposium on Computer architecture, pp. 302-313 (Jun. 20-24, 2009).

Suleman, M. A., et al., "Data Marshaling for Multi-core Architectures," ISCA '10 Proceedings of the 37th annual international symposium on Computer architecture, pp. 441-450 (Jun. 19-23, 2010).

* cited by examiner

THREAD MIGRATION ACROSS CORES OF A MULTI-CORE PROCESSOR

CROSS-REFERENCE TO RELATED APPLICATIONS

This application is a U.S. National Stage filing under 35 U.S.C. §371 of International Application No. PCT/US13/45129, filed on Jun. 11, 2013 ("International Application"), which in turn claims priority under 35 U.S.C. §119(a) to Indian Patent Application No. 3140/CHE/2012, filed on Jul. 31, 2012 ("Indian Patent Application"). The disclosure of the International Application and the Indian Patent Application are hereby incorporated by reference in their entirety.

BACKGROUND

Unless otherwise indicated herein, the approaches described in this section are not prior art to the claims in this application and are not admitted to be prior art by inclusion in this section.

Many modern computing systems utilize multi-core processors having two or more processor cores interfaced for enhanced performance and efficient processing of multiple tasks and threads. Thread migration can be utilized in multi-core processors to mitigate issues such as thermal hotspots, cache utilization, load balancing, communication localization, and hardware error tolerance. For example, the execution of a thread may be moved away from a processing core that develops a thermal hotspot during operation. In another example, thread migration is used to move execution of a thread closer to data that the processor accesses for execution of the thread.

In some examples, when execution of a thread is migrated from a source core to a target core of a multi-core processor, the entire architectural state and micro-architectural state of the source core can be proactively migrated to the target core either through a network message or through data cache coherence operations. For example, registers and translation lookaside buffer (TLB) entries may be stored in data cache of the source core and may be subsequently migrated to data cache of the target core before being transferred to the corresponding registers and TLB of the target core. In other examples, such values may be stored on on-chip memory such as SRAM. In certain processors, additional machine instructions are executed in both the source core and the target core to achieve this migration of registers and the TLB entries. For example, additional micro-code instructions may be executed in the source core to save the architectural states and the micro-architectural states to data caches. Moreover, micro-code instructions may be executed in the target core to load these values to the corresponding registers and TLB of the target core.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to thread migration across processing cores of a multi-core processor. The various described techniques may be applied to methods, systems, devices or combinations thereof. Execution of a thread may be migrated from a first processing core to a second processing core. Selective state data required for execution of the thread on the second processing core can be identified and can be dynamically acquired from the first processing core. The acquired state data can be utilized by the thread executed on the second processing core.

According to some examples of the present disclosure, various methods related to migrating a thread across cores in a multi-core processor are described. Some example methods may include executing a thread on a first processing core of the multi-core processor and migrating execution of the thread from the first processing core to a second processing core of the multi-core processor. Selective state data required for execution of the thread on the second processing core may be identified and the identified state data may be dynamically acquired from the first processing core. The acquired state data can be utilized by the thread executing on the second processing core.

According to additional examples of the present disclosure, additional methods related to migrating a thread across cores in a multi-core processor are described. Some example methods may include augmenting state data associated with architectural states and micro-architectural states of two or more of the plurality of processing cores with tags. The execution of a thread can be migrated from a first processing core to a second processing core of the two or more of the plurality of processing cores. A read access of portions of the state data of the first processing core by the thread executed on the second processing core may be detected using the tags associated with the state data of the second processing core. The portions of state data from the first processing core are dynamically acquired in response to detection of the read access and the acquired portions of the state data are used by the thread executing on the second processing core. A status indicator of the portions of the state data in the first processing core can be updated to indicate a migrated status of the data.

According to still further examples of the present disclosure, multi-core processors devices are described. Some described multi-core processors may include a plurality of processing cores including at least a first processing core and a second processing core. Each of the plurality of processing cores may include at least one architectural state component configured to store state data associated with an architectural state of the processing core and at least one micro-architectural state component configured to store state data associated with a micro-architectural state of the processing core. The state data associated with the architectural state and the micro-architectural state may be implemented with associated tags indicative of a status of the state data as execution of a thread is migrated from the first processing core to the second processing core. Each of the plurality of processing cores may also include a coherence module that may be coupled to the at least one architectural state component and to the at least one micro-architectural state component. The coherence module can be configured to acquire selective state data from the first processing core required for execution of the migrated thread on the second processing core.

DETAILED DESCRIPTION

Figure 1:
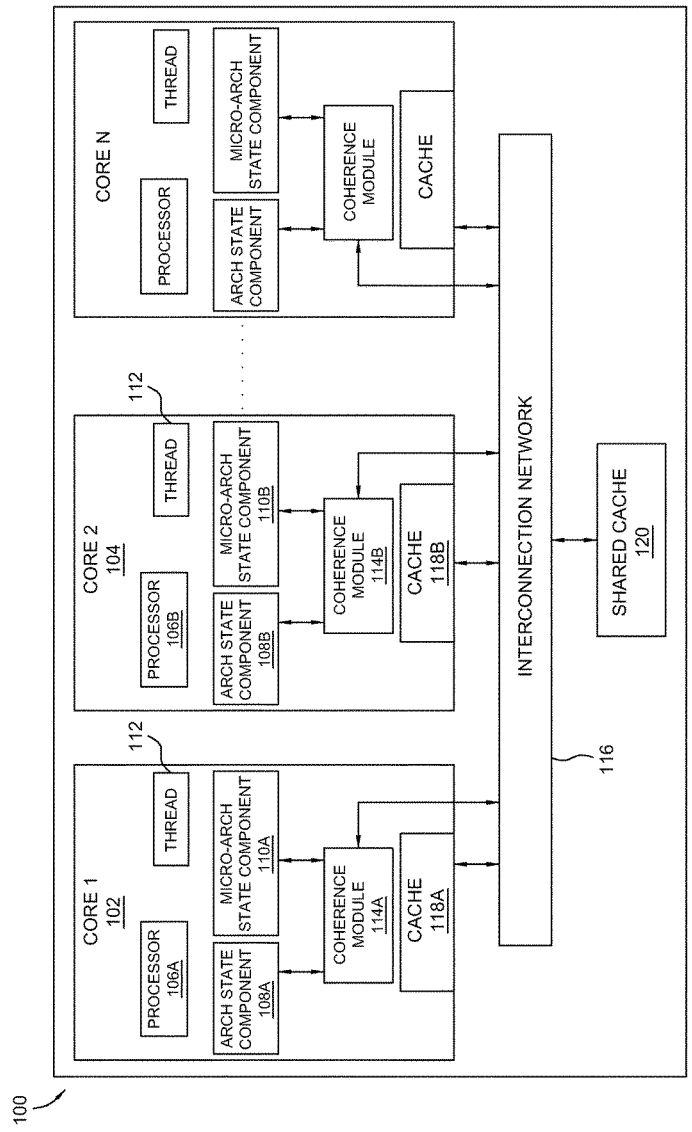
FIG. 1 is a schematic diagram illustrating functional components of an example multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques for migrating threads across processing cores in a multi-core processor. The multi-core processor may include two or more processing cores. One or more threads are migrated from a source core to a target core selected from the two or more processing cores. In the described embodiments, a state coherence protocol is utilized to acquire selective state data from the source core while a migrated thread is executed on the target core. The need-based acquisition of the state data may reduce migration-related traffic of the threads and may enhance the performance of the multi-core processor.

Example Multi-Core Processor: FIG. 1 is a schematic diagram illustrating functional components of an example multi-core processor 100 arranged in accordance with at least some embodiments of the present disclosure. The multi-core processor 100 may be a general-purpose processor, a special-purpose processor, an embedded processor, a graphics processor, or the like. The multi-core processor 100 may include a plurality of processing cores including at least a first processing core 102 and a second processing core 104. Potentially, the number (N) of the processing cores may be any number greater than one. Each of the processing cores (such as the first processing core 102 and the second processing core 104) includes internal functional blocks.

In some embodiments, the first processing core 102 may include a processor 106A, at least one architectural state component 108A and at least one micro-architectural state component 110A. Similarly, the second processing core 104 may include a processor 106B, at least one architectural state component 108B and at least one micro-architectural state component 110B. The architectural state components 108A and 108B can be configured to store data associated with an architectural state of the first processing core 102 and the second processing core 104, respectively. The architectural states can include states that may be accessible (e.g., for read or write access) to the processing cores while executing machine instructions. The architectural state components 108A and 108B may include architectural registers, control registers, flags, a stack pointer, or combinations thereof.

Moreover, the micro-architectural state components 110A and 110B can be configured to store data associated with a micro-architectural state of the first processing core 102 and the second processing core 104, respectively. The micro-architectural states can include states that may be accessible (e.g., for read or write access) to a micro-code of the processing cores. The micro-architectural state components 110A and 110B may include physical registers, branch predictor tables, memory disambiguation buffers, translation lookaside buffer (TLB) registers, store buffers, segment registers, a program counter, or combinations thereof. It should be noted that the above examples of the architectural and micro-architectural states components are purely illustrative and states may be classified differently based upon the processor type. In various example embodiments, state data associated with the architectural state and the micro-architectural state of the first processing core 102 and the second processing core 104 includes tags. The tags can be indicative of a status of the state data as execution of a thread 112 is migrated from the first processing core 102 to the second processing core 104. For example, the state data stored in the at least one architectural state component 108A and at least one micro-architectural state component 110A may include tags such as one or more of a valid bit (Vbit), a thread ID (T-Id), a migrated bit (M), an instruction counter (IC), and/or combinations thereof.

In some embodiments, the execution of the thread 112 may be migrated from the first processing core 102 to the second processing core 104 using a thread migration scheduler (not shown). Each of the first processing core 102 and the second processing core 104 may include a coherence module represented by reference numerals 114A and 114B, respectively. The coherence modules 114A and 114B can be configured to facilitate state coherence while the thread 112 migrates from the first processing core 102 to the second processing core 104. It may be noted that although the technique is described with reference to two processing cores, the present technique may be applicable to migration of thread across more than two processing cores.

As the execution of the thread 112 migrates from the first processing core 102 to the second processing core 104, the coherence module 114B can acquire selective state data from the first processing core 102 that may be required for execution of the thread 112 on the second processing core 104. The coherence module 114B can be configured to send a state coherence request to the coherence module 114A of the first processing core 102 over a communication bus such as an interconnection network 116.

The first processing core 102 and the second processing core 104 may include other functional components. For example, the first processing core 102 may include a local cache 118A. Similarly, the second processing core 104 may include a local cache 118B. The local caches 118A and 118B may include L1 and L2 caches. Moreover, the plurality of processing cores may be coupled to a shared cache 120 (L3 cache) through the interconnection network 116. It should be noted that the multi-core processor 100 could include numerous variations of the architecture described above.

Example Architectural State Component: The state data associated with an architectural state of each processing core (e.g., first processing core 102 of the multi-core processor 100) can be stored in the architectural state component 108A. Similarly, the state data associated with the micro-architectural state of each processing core (e.g., first processing core 102) can be stored in the micro-architectural state component 110A.

Figure 2:
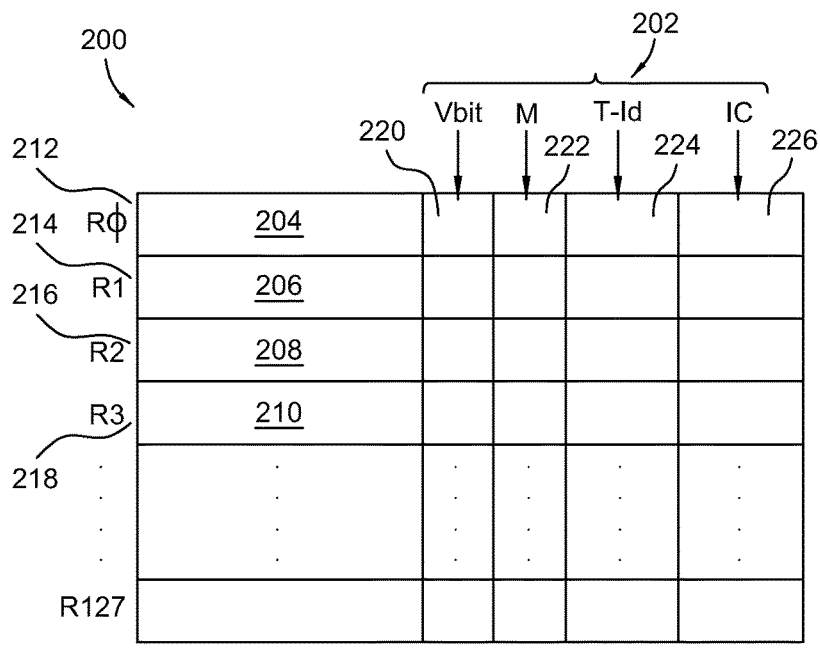
FIG. 2 illustrates an example architectural state component.

FIG. 2 illustrates an example architectural state component 200, arranged in accordance with at least some embodiments described herein. Here, the architectural state component 200 may be represented as a register file with tags 202 associated with entries of the register file 200. In various embodiments, one or more values (such as represented by reference numerals 204, 206, 208 and 210) stored in the registers (R0) 212, (R1) 214, (R2) 216 and (R3) 218 respectively of the register file 200 may be associated with tags such as one or more of a valid bit (Vbit) 220, a migrated bit (M) 222, a thread ID (T-Id) 224, and/or an instruction counter (IC) 226. However, other tags or tag structures may be similarly associated with the state data.

The register file 200 is shown here for illustrative purposes only. The entries of other architectural and micro-architectural state components such as control registers, physical registers, branch predictor tables etc. of the processing cores can be associated with similar tags. Such tags may be utilized to facilitate dynamic acquisition of state data from the first processing core 102 as the migrated thread 112 is executed on the second processing core 104, as will be described with reference to FIGS. 3 and 4. In certain embodiments, one or more tags described above may not be used during acquisition of the state data.

Figure 3:
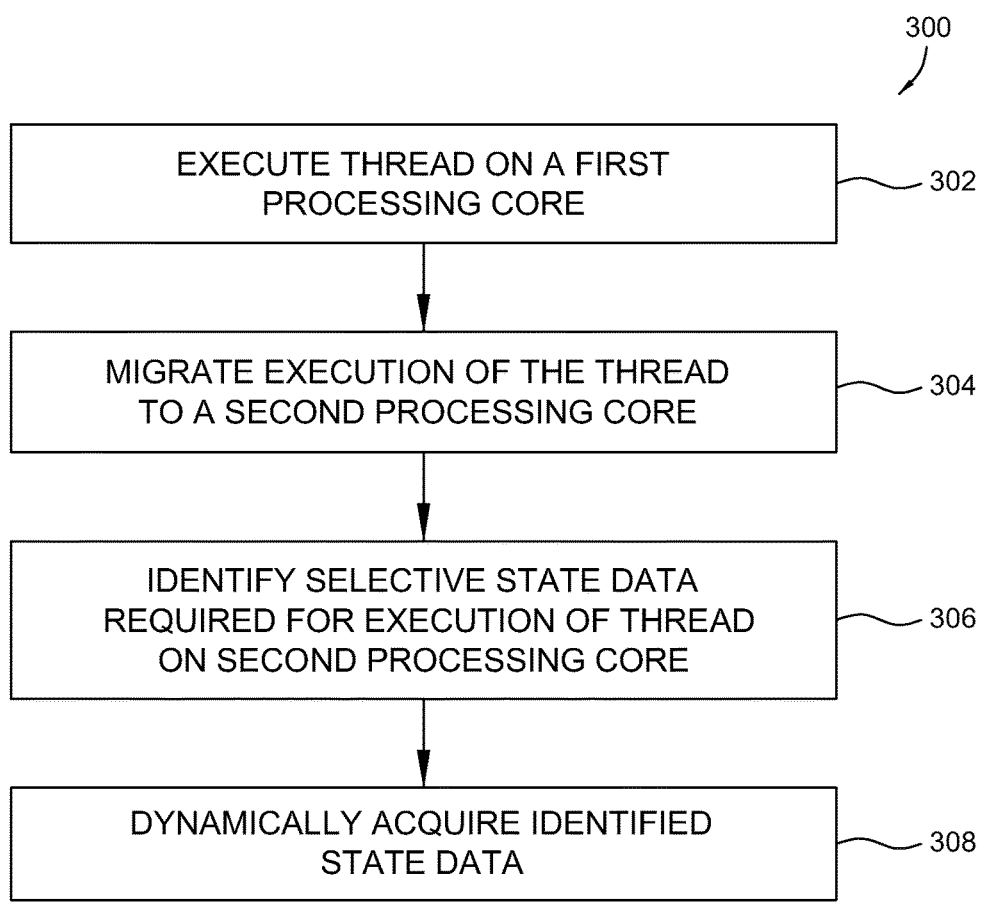
FIG. 3 is an illustration of a process for migrating a thread across processing cores of the multi-core processor of FIG. 1.

Example Process Flow: FIG. 3 is an illustration of an example process 300 for migrating a thread across processing cores (e.g., first processing core 102 and the second processing core 104) of the multi-core processor 100 of FIG. 1, arranged in accordance with at least some embodiments described herein. Process 300 may include one or more operations, functions or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "EXECUTE THREAD ON A FIRST PROCESSING CORE", a thread (112) can be executed on a first processing core (102) of the multi-core processor 100.

Processing may continue from block 302 to block 304, "MIGRATE EXECUTION OF THE THREAD TO A SECOND PROCESSING CORE." At block 304, the execution of the thread (112) can be migrated to a second processing core (104). For example, an instruction sequence for the thread (112) can be migrated from the first processing core (102) to the second processing core (104) using a thread migration scheduler. In some embodiments, the migration of the thread (112) may be in accordance with a pre-determined thread migration schedule. In some other embodiments, the migration of the thread (112) to the second processing core (104) may be initiated to move away from thermal hotspots developed during operation of first processing core (102).

Processing may continue from block 304 to block 306, "IDENTIFY SELECTIVE STATE DATA REQUIRED FOR EXECUTION OF THREAD ON SECOND PROCESSING CORE". At block 306, selective state data that may be required for execution of the thread (112) on the second processing core (104) can be identified. In some examples, the processor (106B) of the second processing core may access entries of the architectural state component (108B) and/or the micro-architectural state component (110B) for executing a migrated instruction sequence for the thread (112) on the second processing core (104). The processor (106B) may then identify the respective state data required from the first processing core (102). In some examples, the selective state data required for execution of the thread (112) on the second processing core may be a portion of the state data of the first processing core (102). Examples of identification of the state data for the first processing core (102) will be described in a greater detail with reference to FIG. 4.

In various embodiments, the identified state data may be data associated with architectural states and/or micro-architectural states of the first processing core (102). Such state data may be stored in the at least one architectural state component (108A) and/or at least one micro-architectural state component (110A) of the first processing core (102). In operation, a first portion of the state data of the first processing core (102) can be acquired from the first processing core (102) to initiate the execution of the thread (112) on the second processing core (104). The first portion of the state data may include some values of the state data (e.g., program counter) that may be required to initiate the execution of the thread (112) on the second processing core (104).

In some examples, the first portion of the state data may include values (204) and (206) corresponding to registers (R0) (212) and (R1) (214) of the first processing core 102. Such values can be copied to the corresponding registers of the second processing core 104. A status indicator of the first portion of the state data in the first processing core (102) can then be updated to a migrated status. In this example, a migrated bit (M) of the first portion of the state data can be updated to indicate the migrated status of the first portion of the state data. For example, once the values (204) and (206) are copied to the corresponding registers of the second processing core (104), then the tag M corresponding to these values in the first processing core (102) can be set to a value (e.g., 1) to indicate the migrated status of these values. Similarly, the tag Vbit corresponding to the values (204) and (206) can be set to a value (e.g., 1) in the second processing core 104 to indicate valid entries of the registers (R0) (212) and (R1) (214). Further, the tag M corresponding to each of these values can be set to a value (e.g., 0) in the second processing core (104) to indicate that these values have not been migrated yet. Any appropriate set of values as may be utilized (e.g., single bit or multi-bit tags of any desired value), and the above described values are merely examples that are not to be construed as limiting the concepts described herein.

The execution of the thread (112) can then be initiated on the second processing core (104). The execution of thread 112 may use the acquired first portion of the state data while executing on the second processing core (104). Moreover, a second portion of the state data may be retained with the first processing core (102). For example, the second portion of the state data may include values 208 corresponding to register (R2) (216) of the register file (200).

In some example embodiments, a read access of one or more parts of the second portion of the state data by the thread (112) executing on the second processing core (104) may be detected by the coherence module (114A) of the first processing core (102). In this example, a read access of the register R2 (216) may be detected. The one or more parts accessed by the thread (112) can be identified as the selective state data required for execution of the thread (112) on the second processing core (104). Here, the values 208 corresponding to the register R2 (214) may be identified as the selective state data. Such data can be dynamically acquired using a state coherence protocol (block 308). Moreover, the status indicator of the one or more parts of the second portion of the state data can subsequently be updated to migrated status.

In certain other embodiments, the selective state data may be acquired using other communication mechanisms. For example, in certain multi-core processors, a read access of a register of a target processing core that is marked as "Invalid" may trigger a messaging unit to send a request for the corresponding value to the source processing core. In another example, a read access of an "Invalid" register may result in a trap to the operating system, e.g., an interrupt, so that the operating system can direct the processing core to implement the functionality of the messaging unit.

In some alternate embodiments, a write access of one or more parts of the second portion of the state data by the thread (112) executing on the second processing core (104) may be detected by the coherence module (114B) of the second processing core (104). For example, a write access to values (210) of the register (R3) (218) of the second processing core (104) may be detected. An invalidation message identifying the one or more parts of the second portion of the state data such as values (210) can be sent to the first processing core (102) and the status indicator of the one or more parts of the second portion of the state data in the first processing core (102) can be updated to migrated status (e.g., setting the tag M to 1). In various example embodiments, the thread (112) executing on the second processing core (104) may overwrite the values (210) of the register R3 (218) without reading the values from the first processing core (102). In certain embodiments, when a write access to valid state entries of the second processing core (104) is detected, invalidation messages may not be sent to the first processing core (102).

As described above, the state data acquired from the first processing core (102) may be used by the thread (112) that is executed on the second processing core (104). The dynamic acquisition of the state data from the first processing core (102) will be described in a greater detail with reference to FIG. 4.

Figure 4:
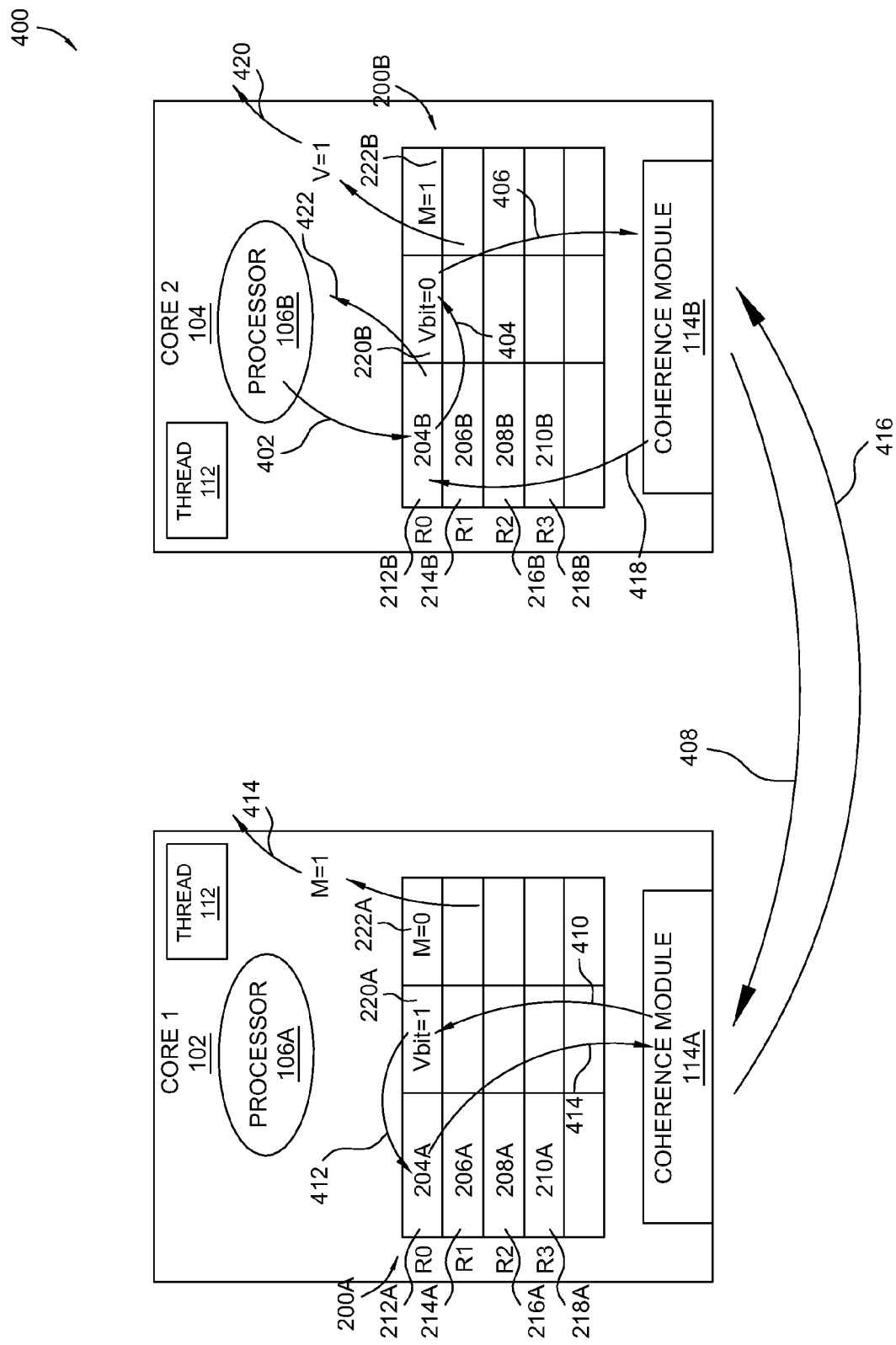
FIG. 4 is a block diagram illustrating an example implementation of a state coherence protocol to dynamically acquire state data for thread migration from a first processing core to a second processing core of a multi-core processor.

Dynamic Acquisition of State Data: FIG. 4 is a block diagram illustrating an example implementation 400 of a state coherence protocol to dynamically acquire state data for thread migration from the first processing core 102 to the second processing core 104 of the multi-core processor 100 of FIG. 1, arranged in accordance with at least some embodiments described herein. In various illustrated embodiments, execution of the thread 112 can be migrated from the first processing core 102 to the second processing core 104. In some example embodiments, the first processing core 102 includes an architectural state component such as a register file 200A and the second processing core 104 includes a register file 200B. For ease of description, a register file can be utilized to depict an architectural state component of each of the processing cores 102 and 104. However, the same technique applies to other architectural and micro-architectural state components.

Initially, entries/values such as 204A, 206A, 208A and 210A of registers (R0) 212A, (R1) 214A, (R2) 216A and (R3) 218A of the register file 200A can be associated with tags such as Vbit 220A and M 222A. Similarly, values (such as represented by reference numerals 204B, 206B, 208B and 210B) of the registers (R0) 212B, (R1) 214B, (R2) 216B and (R3) 218B of the register file 200B can be associated with tags such as (Vbit) 220B and (M) 222B. As the execution of the thread 112 is migrated to the second processing core 104, the tags of the values associated with the architectural states and the micro-architectural states on the second processing cores can be reset. As can be seen, the (Vbit) 220B of the value 204B of the register 212B of the second processing core 104 can be set as "false" (e.g., Vbit=0).

Once the execution of the thread 112 is initiated on the second processing core 104, the processor 106B accesses the value 204B of the register file 200B (operation 402). The thread 112 encounters a "register miss" as the Vbit of the value 204B can be set as "false" (operation 404). Similarly, the thread may encounter a "TLB miss" as the T-Id of the value does not match with the T-Id of the executing thread 112. A state coherence request can be sent to the coherence module 114B of the second processing core 104 to trigger the state coherence protocol (operation 406). The state coherence request can be sent from the coherence module 114B to the coherence module 114A of the first processing core 102 for acquiring the respective value 204A of the corresponding register 212A from the first processing core 102 (operation 408).

The coherence module 114A of the first processing core 102, upon receiving the state coherence request, can detect a valid entry (Vbit=1) 220A on the register (R0) 212A of the register file 200A of the first processing core 102 (operation 410). The coherence module 114A can then access the corresponding value 204A of the register (R0) 212A from the register file 200A (operation 412). The status of the entry 204A can then be updated to a migrated status by setting the migrated bit (Mbit) 222A (operation 414). The value of the entry 204A can then be passed on to the coherence module 114B of the second processing core 104 (operation 416). The value then replaces the current value 204B of the register (R0) 212B of the register file 200B (operation 418) and the Vbit 220B of the corresponding entry can be set to be valid (operation 420). This updated value 204B can be utilized by the processor 106B while executing the thread 112 on the second processing core 104 (operation 422). Such selective acquisition of values of required entries of architectural and/or micro-architectural states is performed during execution of the thread 112 on the second processing core 104. Further, once status of all the entries of the first processing core 102 is updated to the migrated status, the corresponding entries may be removed from the first processing core 102. In some examples, the Vbits 220 of the entries may be set as "false" and the entries may be removed in a single-cycle flush operation, and the operating system and/or a thread scheduler may be notified that the first processing core 102 is available to receive a new thread.

Thread Migration Across More than Two Processing Cores: The embodiments illustrated above describe dynamic acquisition of portions of state data associated with architectural states and/or micro-architectural states when the thread migrates from a first processing core 102 to a second processing core 104 of a multi-core processor 100. In certain embodiments, a thread may migrate multiple times and across more than two cores.

Figure 5:
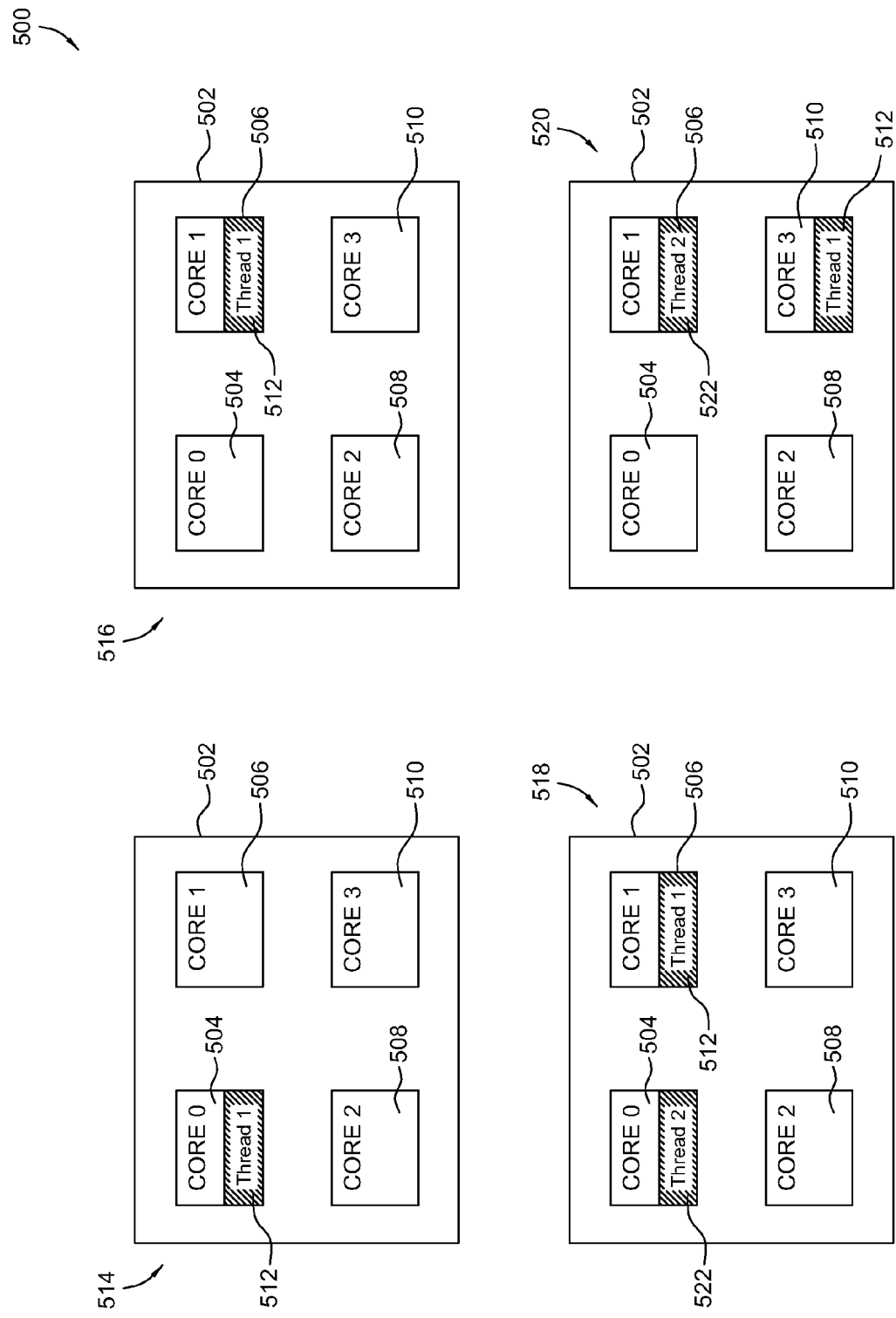
FIG. 5 illustrates example scenarios of thread migration across multiple cores of a multi-core processor.

FIG. 5 illustrates example scenarios 500 of thread migration across multiple cores of a multi-core processor 502, arranged in accordance with at least some embodiments described herein. As illustrated, the multi-core processor 502 may include four processing cores generally represented by reference numerals 504, 506, 508 and 510. A thread 512 can be migrated across multiple processing cores as illustrated in example implementations 514, 516, 518 and 520. As can be seen, the execution of the thread 512 can be migrated from the processing core 504 to the processing core 506 and subsequently from the processing core 506 to the processing core 510. Moreover, execution of another thread 522 may be initiated on the core 504 and subsequently migrated to the core 506.

As described with reference to FIG. 2, one or more values stored in the architectural state components and the micro-architectural state components may be associated with the instruction counter (IC) 226. The instruction counter 226 may be utilized for acquisition of values during migration of the thread 512 across multiple processing cores such as the processing cores 504, 506, 508, and 510. The instruction counter 226 provides a dynamic instruction number to instructions that produced the value of an entry of the architectural state components and the micro-architectural state components. In some examples, the dynamic instruction number can be maintained in a register and may be incremented each time an instruction of the program is executed, thereby tracking the number of instructions executed by the program. As the execution of thread 512 migrates across the processing cores 504, 506, and 510, different versions of the architectural states and the micro-architectural states having different IC values are available in the processing cores 504, 506, and 510.

For example, the current processing core (e.g., processing core 510 in example implementation 520) may initiate the state coherence request to acquire value 210 for the register 218 of the core 510. In some embodiments, each of the cores 504, 506, and 508 can respond to the state coherence request and can send the corresponding values for the register 218 to the processing core 510. The current processing core 510 can receive values from various cores (such as cores 504, 506 and 508) and can also acquire the latest value among the received values for the register 218. In some other embodiments, the IC value for the values from each core (such as 504 and 506) can be compared and the values that correspond to the highest IC value can be acquired by the processing core 510 thereby ensuring acquisition of latest value of the entry. In yet other embodiments, the processing core 510 may send a state coherence request directly to another core (e.g., processing core 504) to acquire the corresponding value from the processing core 504.

In certain other embodiments, other tags/data structures may be used to facilitate the state coherence as the thread migrates across two or more cores. For example, as the thread 512 is executed on the processing core 504, a state bit vector indicative of each modified state component can be created and stored. Once the thread 512 migrates from the processing core 504 to the processing core 506, the previously stored state bit vector can also be migrated with the thread 512 to the processing core 506. The state bit vector may be used by the processing core 506 for optimizing certain operations such as reducing the number of invalidation messages sent to the processing core 504.

A similar state bit vector corresponding to the thread activity on the processing core 506 may also be created. As the thread 512 migrates from the processing core 506 to the processing core 510, both bit vectors can be migrated to the processing core 510 and a state coherence protocol can utilize the two bit vectors to determine the processing core (504, or 506) to which a state coherence request may be sent by the processing core 510.

The state coherence protocol described herein may be physically and/or logically integrated with a standard cache coherence protocol employed by the multi-core processor. In some examples, the physical integration of the state coherence protocol can be implemented by having the state coherence protocol and the state coherence bits/tags (e.g., Vbit, Mbit and IC) along with the cache coherence protocol. In various examples, the logical integration of the state coherence protocol may be implemented by memory mapping state bits addresses while sending state coherence requests to coherence modules such that a single coherence protocol can handle both memory/cache coherence and state coherence. The various techniques described herein may result in reduced implementation costs for design and verification of the protocol.

The example methods and systems described above provide an on-chip thread migration mechanism that implements a state coherence protocol to dynamically acquire state data associated with architectural and/or micro-architectural states from a source core while a migrated thread is executed on a target core. The need-based acquisition of state data may reduce the amount of data transferred to the target core and speed up the migration process by reducing the migration-related traffic.

Figure 6:
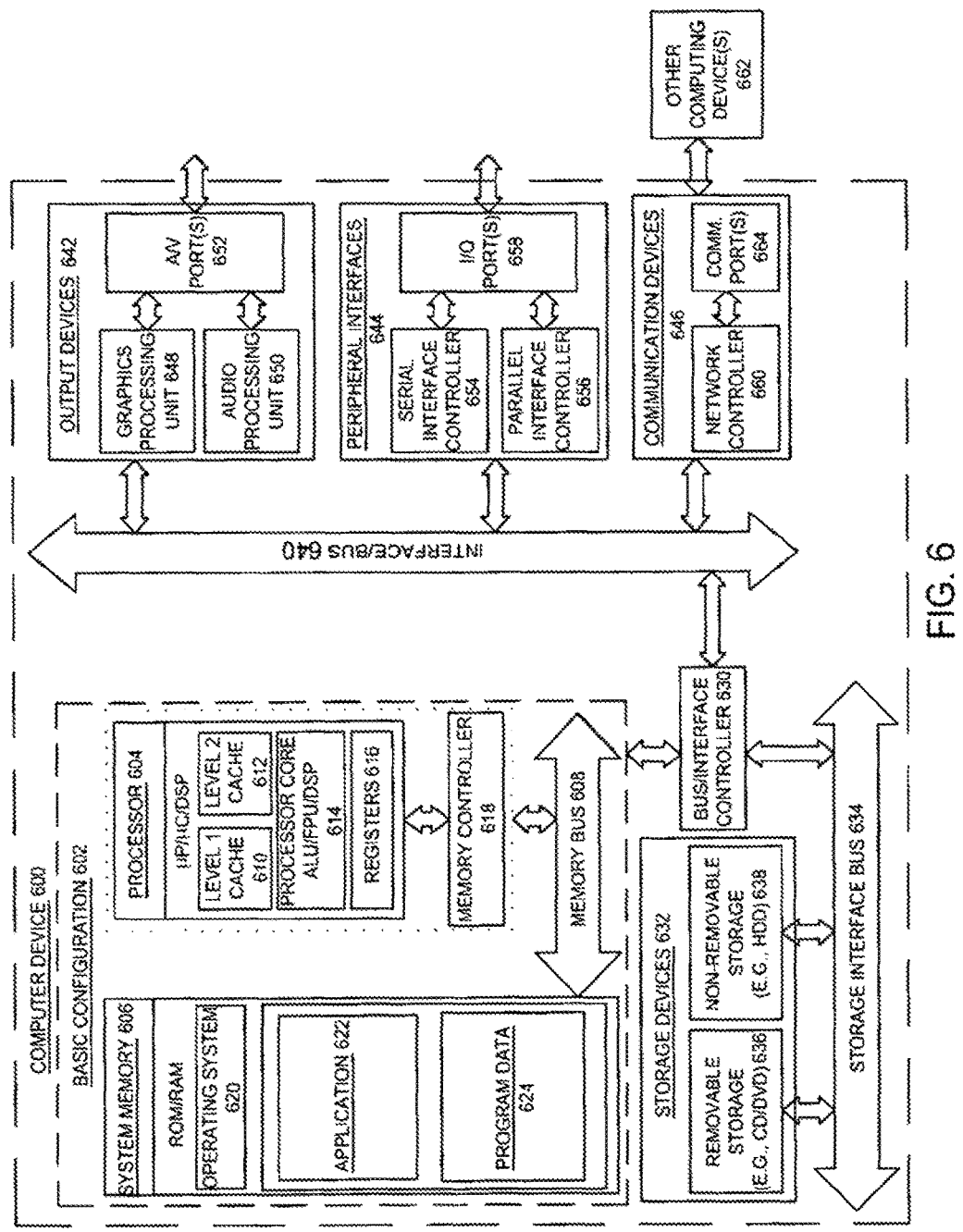
FIG. 6 is a block diagram illustrating an example computing device that is arranged for migration of threads across cores of a multi-core processor, all arranged in accordance with at least some embodiments of the present disclosure.

Example Computing Device: FIG. 6 is a block diagram illustrating an example computing device 600 that is arranged for migration of threads across cores of a multi-core processor in accordance with at least some embodiments of the present disclosure. In a very basic configuration 602, the computing device 600 typically includes one or more processors 604 and a system memory 606. A memory bus 608 may be used for communicating between processor 604 and system memory 606. The processor 604 includes a multi-core processor.

Depending on the desired configuration, processor 604 may be of any type including but not limited to a microprocessor (μP), a microcontroller (μC), a digital signal processor (DSP), or any combination thereof. Processor 604 may include one or more levels of caching, such as a level one cache 610 and a level two cache 612, two or more processor cores 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604. The processor 604 may include a coherence module such as described above to facilitate selective acquisition of state data from the registers 616 during migration of a thread across two or more processing cores of the processor 604.

Depending on the desired configuration, system memory 606 may be of any type including but not limited to volatile memory (such as RAM), non-volatile memory (such as ROM, flash memory, etc.) or any combination thereof. System memory 106 may include an operating system 620, one or more applications 622, and program data 624. In some embodiments, application 622 may be arranged to operate with program data 624 on operating system 620. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 6600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652.

Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to migrate a thread from a first processing core to a second processing core of a multi-core processor, the method comprising:
   executing the thread on the first processing core of the multi-core processor;
   migrating the execution of the thread from the first processing core to the second processing core of the multi-core processor;
   detecting a read access by the thread that executes on the second processing core, wherein the read access corresponds to first architectural state data, and wherein the first architectural state data relates to the execution of the thread on the second processing core;
   identifying the first architectural state data, in response to the detection of the read access, based on one or more tags associated with second architectural state data, wherein the one or more tags indicate a status of the second architectural state data as the execution of the thread is migrated from the first processing core to the second processing core, wherein the first architectural state data is associated with a first architectural state of the first processing core, and wherein the second architectural state data is associated with a second architectural state of the second processing core; and
   acquiring a first portion of the first architectural state data from the first processing core, wherein the acquired first portion of the first architectural state data is utilized by the thread that executes on the second processing core;
   migrating the execution of the thread from the second processing core to a third processing core of the multi-core processor;
   comparing a first value of a first instruction counter of the first architectural state data with a second value of a second instruction counter of the second architectural state data;
   determining, based on the comparison, that the first value is higher than the second value;
   identifying the first processing core in response to the determination that the first value is higher than the second value;
   acquiring, in response to the identification of the first processing core, a second portion of the first architectural state data from the first processing core; and
   executing the thread on the third processing core based on the acquired second portion of the first architectural state data.

2. The method of claim 1, wherein identifying the first architectural state data comprises identifying the first architectural state data from the first processing core by the second processing core.

3. The method of claim 1, wherein identifying the first architectural state data comprises identifying the first portion of the first architectural state data.

4. The method of claim 1, wherein acquiring the first portion of the first architectural state data comprises acquiring the first portion of the first architectural state data from the first processing core using a coherence module of the second processing core.

5. The method of claim 4, further comprising transferring the first architectural state data from the first processing core to the second processing core over a communication bus coupled to the first processing core and to the second processing core.

6. The method of claim 1, wherein acquiring the first portion of the first architectural state data comprises acquiring data associated with a micro-architectural state of the first processing core.

7. The method of claim 1, wherein acquiring the first architectural state data, associated with the first architectural state, comprises acquiring one or more values stored in architectural registers, control registers, flags, a stack pointer, or combinations thereof.

8. The method of claim 6, wherein acquiring the data associated with the micro-architectural state comprises acquiring one or more values stored in physical registers, branch predictor tables, memory disambiguation buffers, translation lookaside buffer (TLB) registers, store buffers, segment registers, a program counter, or combinations thereof.

9. The method of claim 1, wherein migrating the execution of the thread from the first processing core to the second processing core comprises:
   acquiring the first portion of the first architectural state data from the first processing core by the second processing core prior to initiating the execution of the thread on the second processing core;
   updating a status indicator of the acquired first portion of the first architectural state data in the first processing core to a migrated status; and
   initiating the execution of the thread on the second processing core using the acquired first portion of the first architectural state data.

10. The method of claim 9, wherein:
   detecting the read access includes detecting a read access of one or more parts of the first portion of the first architectural state data; and
   identifying the first architectural state data includes identifying the one or more parts of the first portion of the first architectural state data in the first processing core as the first architectural state data related to the execution of the thread on the second processing core.

11. The method of claim 10, wherein the status indicator includes a first status indicator, wherein the migrated status includes a first migrated status, and wherein acquiring the first portion of the first architectural state data comprises:
   acquiring the one or more parts of the first portion of the first architectural state data from the first processing core; and
   updating a second status indicator of the one or more parts of the first portion of the first architectural state data in the first processing core to a second migrated status.

12. The method of claim 9, wherein identifying the first architectural state data comprises:
   detecting a write access of one or more parts of another portion of the first architectural state data by the thread that executes on the second processing core;
   sending an invalidation message that identifies the one or more parts of the another portion of the first architectural state data to the first processing core; and
   updating a another status indicator of the one or more parts of the another portion of the first architectural state data in the first processing core to a second migrated status.

13. The method of claim 1, wherein acquiring the first portion of the first architectural state data comprises acquiring the first portion of the first architectural state data from the first processing core through a state coherence protocol.

14. A system effective to migrate a thread across cores in a multi-core processor, the system comprising:
   a first processing core;
   a second processing core; and
   a third processing core;
   the first processing core being configured to augment first architectural state data, associated with a first architectural state of the first processing core, with one or more first tags;
   the second processing core being configured to augment second architectural state data, associated with a second architectural state of a second processing core, with one or more second tags;
   the first processing core being further configured to migrate execution of the thread from the first processing core to the second processing core;
   the second processing core being further configured to:
      detect a read access by the thread that executes on the second processing core, wherein the detection is based on a use of the one or more second tags associated with the second architectural state data, and wherein the read access corresponds to a first portion of the first architectural state data;
      acquire the first portion of the first architectural state data from the first processing core, in response to the detection of the read access, wherein the acquired first portion of the first architectural state data is utilized by the thread that executes on the second processing core;
      set a migration bit of the first architectural state data, in the first processing core, to indicate a migrated status of the first architectural state data, wherein the migrated status of the first architectural state data is indicative of a completed migration of the first architectural state data from the first processing core to the second processing core; and
      migrate the execution of the thread from the second processing core to the third processing core;
   the third processing core being configured to:
      compare a first value of a first instruction counter of the first architectural state data with a second value of a second instruction counter of the second architectural state data;
      based on the comparison, determine that the first value is higher than the second value;
      identify the first processing core in response to the determination that the first value is higher than the second value;
      in response to the identification of the first processing core, acquire a second portion of the first architectural state data from the first processing core; and
      execute the thread based on the acquired second portion of the first architectural state data.

15. The system of claim 14, wherein:
   the first processing core includes a first coherence module, and the first coherence module is configured to associate the one or more first tags with one or more values of the first architectural state of the first processing core to augment the first architectural state data, and
   the second processing core includes a second coherence module, and the second coherence module is configured to associate the one or more second tags with one or more values of the second architectural state of the second processing core to augment the second architectural state data.

16. The system of claim 14, wherein the augmentation of the first architectural state data and the second architectural state data comprises associations of the one or more first tags and the one or more second tags, with one or more values stored in architectural registers, control registers, flags, a stack pointer, or combinations thereof.

17. The system of claim 14, wherein:
   the augmentation of the first architectural state data comprises an augmentation of the first architectural state data with a first micro-architectural state of the first processing core,
   the augmentation of the second architectural state data comprises an augmentation of the second architectural state data with a second micro-architectural state of the second processing core, and
   the augmentation of the first architectural state data and the second architectural state data with the first micro-architectural state and the second micro-architectural state, respectively, comprises associations of respective one or more first tags and one or more second tags with one or more values stored in physical registers, branch predictor tables, memory disambiguation buffers, translation lookaside buffer (TLB) registers, store buffers, segment registers, a program counter, or combinations thereof.

18. The system of claim 14, wherein the augmentation of the first architectural state data and the second architectural state data comprises an augmentation of the first and second architectural state data with a valid bit (Vbit), a thread ID (T-Id), an instruction counter (IC), or combinations thereof.

19. The system of claim 14, wherein the migration of the execution of the thread from the first processing core to the second processing core comprises use of a thread migration scheduler to facilitate a migration of an instruction sequence for the thread from the first processing core to the second processing core.

20. The system of claim 14, wherein the detection of the read access that corresponds to the first portion of the first architectural state data comprises a detection of the read access being performed by a coherence module of the second processing core.

21. The system of claim 14, wherein the acquisition of the first portion of the first architectural state data comprises an acquisition of the first architectural state data being performed by a coherence module of the second processing core.

22. The system of claim 21, wherein the first processing core is further configured to transfer the first architectural state data from the first processing core to the second processing core with use of a communication bus coupled to the first processing core and to the second processing core.

23. The system of claim 14, wherein the acquisition of the first portion of the first architectural state data comprises an acquisition of the first portion of the first architectural state data with use of a state coherence protocol.

24. A method to migrate a thread across cores in a multi-core processor, the method comprising:
augmenting first state data, associated with a first architectural state of a first processing core of two or more processing cores of the multi-core processor, with one or more first tags;
augmenting second state data, associated with a second architectural state of a second processing core of the two or more processing cores of the multi-core processor, with one or more second tags;
migrating execution of a thread from the first processing core to the second processing core;
detecting a read access by the thread that executes on the second processing core, by using the one or more second tags associated with the second state data, wherein the read access corresponds to a portion of the first state data;
acquiring the portion of the first state data from the first processing core, in response to the detection of the read access, wherein the acquired portion of the first state data is utilized by the thread that executes on the second processing core;
updating a status indicator in the first processing core to indicate a migrated status of the first state data, wherein the status indicator corresponds to the acquired portion of the first state data, and wherein the acquired portion of the first state data includes a first portion of the first state data;
migrating the execution of the thread from the second processing core to a third processing core of the two or more processing cores of the multi-core processor;
comparing a first value of a first instruction counter of the first state data with a second value of a second instruction counter of the second state data;
based on the comparison, determining that the first value is a higher value among the first value and the second value;
identifying the first processing core, in response to the determination that the first value is the higher value among the first value and the second value;
in response to the identification of the first processing core, acquiring a second portion of the first state data; and
executing the thread on the third processing core using the acquired second portion of the first state data, wherein updating the status indicator comprises setting a migration bit of the acquired first portion of the first state data and the second portion of the first state data by a coherence module of the first processing core.

25. A multi-core processor, comprising:
a plurality of processing cores that includes at least a first processing core, a second processing core, and a third processing core, wherein the first processing core comprises:
at least a first architectural state component configured to store first architectural state data associated with a first architectural state of the first processing core, wherein the first architectural state data comprises first tags indicative of a status of the first architectural state data; and
a first coherence module that is coupled to the first architectural state component, wherein the second processing core comprises:
at least a second architectural state component configured to store second architectural state data associated with a second architectural state of the second processing core, wherein the second architectural state data comprises second tags indicative of a status of the second architectural state data; and
a second coherence module that is coupled to the at least the second architectural state component, wherein the second coherence module is configured to:
identify a first portion of the first architectural state data based on the second tags associated with the second architectural state data, wherein the first portion of the first architectural state data relates to an execution of a thread on the second processing core, and wherein the thread is migrated to the second processing core from the first processing core;
in response to the identification of the first portion of the first architectural state data, acquire the first portion of the first architectural state data from the first processing core for execution of the migrated thread on the second processing core;
update a status indicator to indicate a migrated status of the first architectural state data, wherein the migrated status of the first architectural state data is indicative of a completed migration of the first architectural state data from the first processing core to the second processing core; and
migrate the execution of the thread from the second processing core to the third processing core;
wherein the third processing core is configured to:
compare a first value of a first instruction counter of the first architectural state data with a second value of a second instruction counter of the second architectural state data;
based on the comparison, determine that the first value is higher than the second value;
identify the first processing core, in response to the determination that the first value is higher than the second value;
in response to the identification of the first processing core, acquire a second portion of the first architectural state data from the first processing core; and
execute the thread on the third processing core based on the acquired second portion of the first architectural state data.

26. The multi-core processor of claim 25, wherein the multi-core processor comprises either a general-purpose processor, a special-purpose processor, a graphics processor, or an embedded processor.

27. The multi-core processor of claim 25, wherein each of the at least first architectural state component and the at least second architectural state component comprises architectural registers, control registers, flags, a stack pointer, or combinations thereof.

28. The multi-core processor of claim 25, wherein the first processing core includes at least a first micro-architectural state component, wherein the second processing core includes at least a second micro-architectural state component, and wherein each of the at least first micro-architectural state component and the at least second micro-architectural state component comprises physical registers, branch predictor tables, memory disambiguation buffers, translation lookaside buffer (TLB) registers, store buffers, segment registers, a program counter, or combinations thereof.

29. The multi-core processor of claim 25, wherein the first tags and the second tags comprise a valid bit (Vbit), a thread ID (T-Id), an instruction counter (IC), or combinations thereof.

30. The multi-core processor of claim 25, wherein the second coherence module of the second processing core is further configured to detect a read access of the first portion of the first architectural state data, and wherein the identification of the first portion of the first architectural state data is performed in response to the detection of the read access.

31. The multi-core processor of claim 30, further comprising a communication bus that is coupled to the first processing core and the second processing core, wherein the second coherence module of the second processing core is further configured to send a state coherence request to the first processing core over the communication bus.

32. The multi-core processor of claim 31, wherein the second coherence module of the second processing core is configured to acquire the first portion of the first architectural state data from the first processing core over the communication bus, and also configured to update a status of the acquired first portion of the first architectural state data in the first processing core to a migrated state.

* * * * *

UNITED STATES PATENT AND TRADEMARK OFFICE
CERTIFICATE OF CORRECTION

| | |
|---|---|
| PATENT NO. | : 9,804,896 B2 |
| APPLICATION NO. | : 14/128477 |
| DATED | : October 31, 2017 |
| INVENTOR(S) | : Vajapeyam |

Page 1 of 1

It is certified that error appears in the above-identified patent and that said Letters Patent is hereby corrected as shown below:

On the Title Page

In Item (74), under "Attorney, Agent, or Firm", in Column 2, Lines 1-2, delete "Moritt Hock & Hamroff LLP; Stgeven S. Rubin, Esq." and insert -- Moritt Hock & Hamroff LLP; Steven S. Rubin, Esq. --, therefor.

In the Claims

In Column 15, Line 22, in Claim 12, delete "a another status" and insert -- a second status --, therefor.

In Column 17, Line 66, in Claim 24, delete "the second" and insert -- the acquired second --, therefor.

In Column 18, Line 12, in Claim 25, delete "the first" and insert -- the at least the first --, therefor.

Signed and Sealed this
Twenty-fourth Day of April, 2018

Andrei Iancu
*Director of the United States Patent and Trademark Office*